United States Patent
McCoy

(10) Patent No.: US 10,382,629 B2
(45) Date of Patent: Aug. 13, 2019

(54) SYSTEM AND METHOD FOR ROUTING SOCIAL EXPRESSIONS

(71) Applicant: INTERACTIVE INTELLIGENCE GROUP, INC., Indianapolis, IN (US)

(72) Inventor: Edward Dale Victor McCoy, Murfressboro, TN (US)

( * ) Notice: Subject to any disclaimer, the term of this patent is extended or adjusted under 35 U.S.C. 154(b) by 0 days.

(21) Appl. No.: 15/847,724

(22) Filed: Dec. 19, 2017

(65) Prior Publication Data
US 2018/0176380 A1    Jun. 21, 2018

Related U.S. Application Data

(60) Provisional application No. 62/435,956, filed on Dec. 19, 2016.

(51) Int. Cl.
| | | |
|---|---|---|
| H04M 3/523 | (2006.01) | |
| H04L 12/58 | (2006.01) | |
| G06F 17/27 | (2006.01) | |
| H04M 3/51 | (2006.01) | |
| H04M 3/42 | (2006.01) | |

(52) U.S. Cl.
CPC ...... *H04M 3/5235* (2013.01); *G06F 17/2765* (2013.01); *G06F 17/2785* (2013.01); *H04L 51/12* (2013.01); *H04L 51/20* (2013.01); *H04L 51/32* (2013.01); *H04L 51/26* (2013.01); *H04M 3/42068* (2013.01); *H04M 3/5191* (2013.01); *H04M 2203/655* (2013.01)

(58) Field of Classification Search
CPC ....... G06Q 50/01; H04L 51/32; H04M 3/5232
See application file for complete search history.

(56) References Cited

U.S. PATENT DOCUMENTS

| | | | | |
|---|---|---|---|---|
| 2011/0125793 | A1* | 5/2011 | Erhart | G06Q 30/02 707/776 |
| 2012/0072358 | A1* | 3/2012 | Famous | G06Q 50/01 705/319 |
| 2012/0195422 | A1* | 8/2012 | Famous | H04M 3/5232 379/265.09 |
| 2012/0300920 | A1 | 11/2012 | Fagundes et al. | |
| 2013/0262598 | A1* | 10/2013 | Makanawala | H04L 51/32 709/206 |
| 2014/0074728 | A1* | 3/2014 | Margulies | G06Q 30/01 705/304 |
| 2014/0140498 | A1 | 5/2014 | Mezhibovsky et al. | |
| 2014/0164502 | A1* | 6/2014 | Khodorenko | H04L 67/306 709/204 |
| 2014/0270145 | A1 | 9/2014 | Erhart et al. | |
| 2015/0036815 | A1 | 2/2015 | Conway et al. | |
| 2015/0092930 | A1 | 4/2015 | Mullen et al. | |

OTHER PUBLICATIONS

International Search Report and Written Opinion for Application No. PCT/US2017/067418, dated Apr. 12, 2018, 9 pages.

* cited by examiner

*Primary Examiner* — Nafiz E Hoque

(57) ABSTRACT

A method of routing social media communication in a contact center system supporting an organization includes receiving, by a processor, a plurality of communications by one or more users from one or more social media platforms, determining, by the processor, valuation scores for the communications, filtering, by the processor, the communications based on a criteria, reorganizing, by the processor, the filtered communications based on the valuation scores, and routing, by the processor, the communications to a plurality of agents of the contact center system.

17 Claims, 7 Drawing Sheets

SYSTEM AND METHOD FOR ROUTING SOCIAL EXPRESSIONS

CROSS-REFERENCE TO RELATED APPLICATION(S)

The present application claims priority to and the benefit of U.S. Provisional Patent Application No. 62/435,956, entitled "SYSTEM AND METHOD FOR ROUTING SOCIAL EXPRESSIONS", filed in the United States Patent and Trademark Office on Dec. 19, 2016, the entire content of which is incorporated herein by reference.

This application is also related to U.S. patent application Ser. No. 15/815,660, entitled "SYSTEM AND METHOD FOR MANAGING CONTACT CENTER SYSTEM", filed in the United States Patent and Trademark Office on Nov. 16, 2017, the entire content of which is incorporated herein by reference.

FIELD

Aspects of embodiments of the present invention relate to a system and method for mapping social behavior.

BACKGROUND

In order to remain competitive in the modern commerce system, many businesses remain constantly vigilant of evolving consumer demands, and strive to provide customers with the high-quality products and services that they desire. To that end, many businesses employ contact centers that include automated systems and representatives of the business to process transactions and/or service the needs of their customers.

Such contact centers may utilize a number of communication channels to engage with customers, such as social media expressions and exchanges, telephone, email, live web chat, and the like. In many instances, an end user or customer may be contacted by, or routed to, a live human agent to assist the end user with his or her needs.

In some cases, companies may receive communications from customers via one or more third-party social media platforms. Depending on the volume of communications from such third-party social media platforms, and the resources of the business, it may be difficult to manage responses to customers in a timely and effective manner.

The above information discussed in this Background section is only for enhancement of understanding of the background of the described technology, and therefore it may contain information that does not constitute prior art that is already known to a person having ordinary skill in the art.

SUMMARY

Embodiments of the present invention are directed to systems and methods for routing social media communications to contact center agents. According to some embodiments, the contact center system calculates a valuation score for every social media communication that is of interest to a supported organization, and utilizes the valuation score in determining whether to route, and how to prioritize routing of, the social communication to an agent of the contact center for response.

According to some example embodiments of the present invention, there is provided a method of routing social media communication in a contact center system supporting an organization, the method including: receiving, by a processor, a plurality of communications by one or more users from one or more social media platforms; determining, by the processor, valuation scores for the communications; filtering, by the processor, the communications based on a criteria; reorganizing, by the processor, the filtered communications based on the valuation scores; and routing, by the processor, the communications to a plurality of agents of the contact center system.

In some embodiments, the method further includes: buffering, by the processor, the communication received from the social media platform in a first queue for a first period of time; and analyzing, by the processor, the buffered communications for relevance to the organization based on existence of one or more keywords in corresponding texts of the communications.

In some embodiments, analyzing the communications for relevance is further based on one or more of geolocation of the communications, originations times of the communications, and identities of authors of the communications.

In some embodiments, determining valuation scores for the communications includes: determining, by the processor, one or more valuation scores associated with a communication of the plurality of communications based on one or more of a sentiment of the communication; a number of impressions of posts of an author of the communication over a period of time, attentiveness of the author of the communication, number followers of the author of the communication, number of users being followed by the author of the communication, biographical information of the author of the communication, geolocation of the communication, time of the communication, profile engagement of the of the author of the communication, a response distance of the communication.

In some embodiments, determining valuation scores for the communications includes utilizing a machine learning system to determine one or more valuation scores for each one of the plurality of communications based on one or more of a sentiment of the communication; a number of impressions of posts of an author of the communication over a period of time, attentiveness of the author of the communication, number followers of the author of the communication, number of users being followed by the author of the communication, biographical information of the author of the communication, geolocation of the communication, time of the communication, profile engagement of the of the author of the communication, a response distance of the communication.

In some embodiments, filtering the communication based on the criteria includes: determining, by the processor, whether to discard one or more of the communications based on the criteria; and identifying, by the processor, non-discarded communications as filtered communication for routing to the plurality of agents of the contact center system.

In some embodiments, the criteria includes one or more of geolocation of expression, time of origination, gender of expression author, one or more valuations scores.

In some embodiments, determining whether to discard includes: comparing, by the processor, one or more valuation scores of each one of the communications with one or more associated threshold values; and discarding, by the processor, a communication of the plurality of communications for which the associated one or more valuation scores is below the one or more associated threshold values.

In some embodiments, reorganizing the filtered communications based on the valuation scores includes: buffering, by the processor, the filtered communications in a second queue for a second period of time; and sorting, by the processor, the filtered communications in the second queue based on the valuation score.

According to some example embodiments of the present invention, there is provided a system for routing social media communication in a contact center system supporting an organization, the system including: a processor; and a memory coupled to the processor, wherein the memory stores instructions that, when executed by the processor, cause the processor to perform: receiving a plurality of communications by one or more users from one or more social media platforms; determining valuation scores for the communications; filtering the communications based on a criteria; reorganizing the filtered communications based on the valuation scores; and routing the communications to a plurality of agents of the contact center system.

In some embodiments, the instructions further cause the processor to perform: buffering the communication received from the social media platform in a first queue for a first period of time; and analyzing the buffered communications for relevance to the organization based on existence of one or more keywords in corresponding texts of the communications.

In some embodiments, analyzing the communications for relevance is further based on one or more of geolocation of the communications, originations times of the communications, and identities of authors of the communications.

In some embodiments, determining valuation scores for the communications includes: determining one or more valuation scores associated with a communication of the plurality of communications based on one or more of a sentiment of the communication; a number of impressions of posts of an author of the communication over a period of time, attentiveness of the author of the communication, number followers of the author of the communication, number of users being followed by the author of the communication, biographical information of the author of the communication, geolocation of the communication, time of the communication, profile engagement of the of the author of the communication, a response distance of the communication.

In some embodiments, determining valuation scores for the communications includes utilizing a machine learning system to determine one or more valuation scores for each one of the plurality of communications based on one or more of a sentiment of the communication; a number of impressions of posts of an author of the communication over a period of time, attentiveness of the author of the communication, number followers of the author of the communication, number of users being followed by the author of the communication, biographical information of the author of the communication, geolocation of the communication, time of the communication, profile engagement of the of the author of the communication, a response distance of the communication.

In some embodiments, filtering the communication based on the criteria includes: determining whether to discard one or more of the communications based on the criteria; and identifying non-discarded communications as filtered communication for routing to the plurality of agents of the contact center system.

In some embodiments, the criteria includes one or more of geolocation of expression, time of origination, gender of expression author, one or more valuations scores.

In some embodiments, determining whether to discard includes: comparing one or more valuation scores of each one of the communications with one or more associated threshold values; and discarding, by the processor, a communication of the plurality of communications for which the associated one or more valuation scores is below the one or more associated threshold values.

In some embodiments, reorganizing the filtered communications based on the valuation scores includes: buffering, by the processor, the filtered communications in a second queue for a second period of time; and sorting, by the processor, the filtered communications in the second queue based on the valuation score.

According to some example embodiments of the present invention, there is provided a system for routing social media communication in a contact center system supporting an organization, the system including: means for receiving a plurality of communications by one or more users from one or more social media platforms; means for determining valuation scores for the communications; means for filtering the communications based on a criteria; means for reorganizing the filtered communications based on the valuation scores; and means for routing the communications to a plurality of agents of the contact center system.

BRIEF DESCRIPTION OF THE DRAWINGS

A more complete appreciation of the present invention, and many of the attendant features and aspects thereof, will become more readily apparent as the invention becomes better understood by reference to the following detailed description when considered in conjunction with the accompanying drawings, in which like reference symbols indicate like components, wherein.

DETAILED DESCRIPTION

Figure 1:
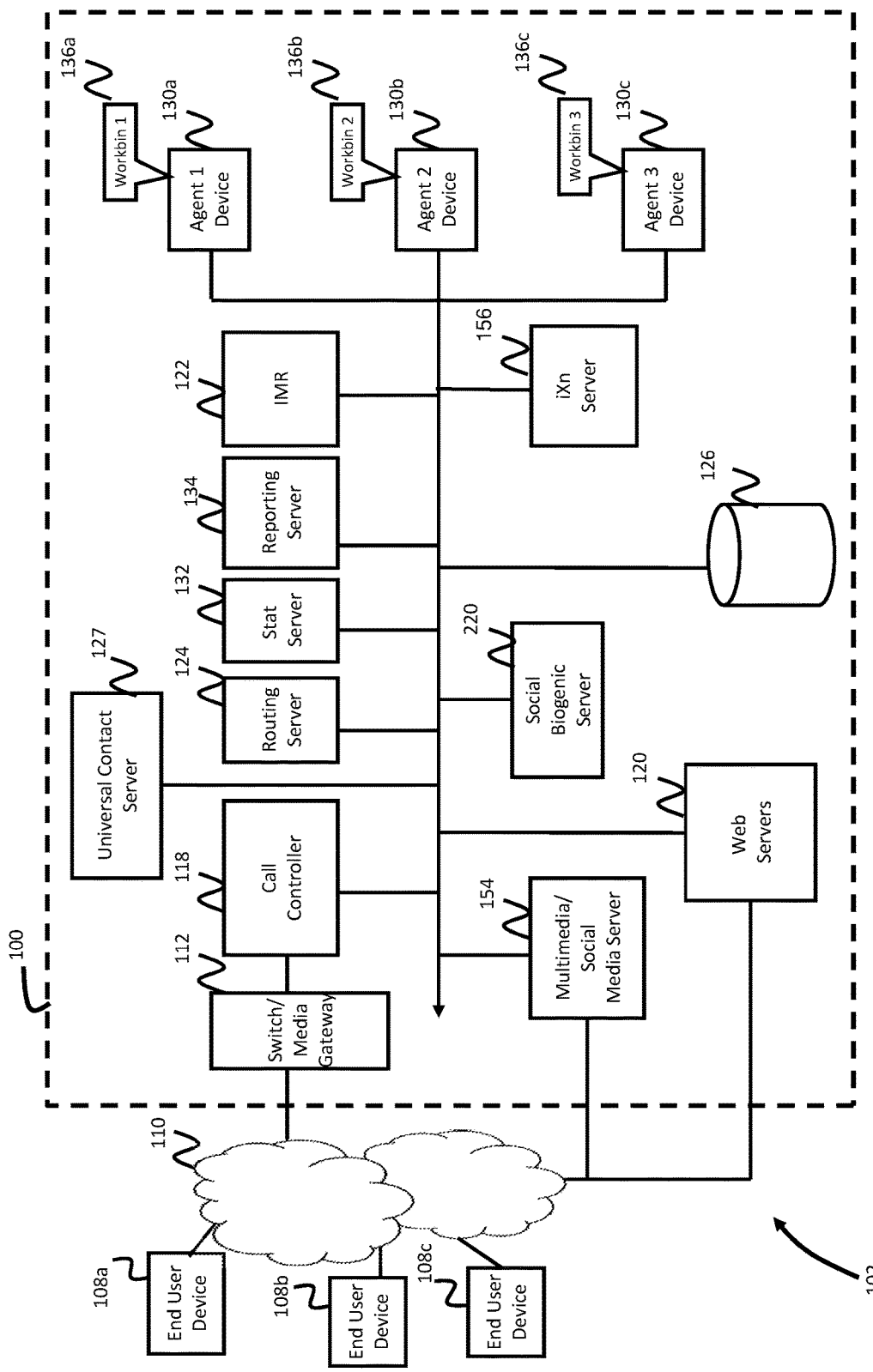
FIG. 1 is a block diagram of a contact center management system according to some embodiments of the present invention.

Aspects of the present invention are described with reference to one or more example embodiments in the following description with reference to the figures, in which like numerals represent the same or similar elements. While the invention is described in terms of the best mode for achieving the invention's objectives, it will be appreciated by those skilled in the art that it is intended to cover alternatives, modifications, and equivalents as may be included within the spirit and scope of the invention as defined by the appended claims and their equivalents as supported by the following disclosure and drawings.

Generally, modern contact centers are staffed with agents or employees who serve as an interface between an organization, such as a company, and outside entities, such as customers. For example, human sales agents at contact centers may assist customers in making purchasing decisions and may receive purchase orders from those customers. Similarly, human support agents at contact centers may assist customers in solving problems with products or services provided by the organization. Interactions between contact center agents and outside entities (customers) may be conducted by voice (e.g., telephone calls or voice over IP or VoIP calls), video (e.g., video conferencing), text (e.g., emails and text chat), or through other media.

In the modern commerce system, social media platforms have become a popular mechanism for customers to engage with businesses. For example, if a customer has complaints about the quality of products or services they receive from a business, the customer may utilize a third-party social media platform (e.g., Facebook®, Twitter®, Snapchat®, LinkedIn®, YouTube®, etc., although embodiments of the present invention are not limited thereto) to send a message to, or about, the business. Many third-party social media platforms provide a mechanism (e.g., a publically available application programming interface (API)) to enable businesses to receive a stream of social media communications or expressions that are targeted toward or mention the business.

The contact center system supporting a business may receive the stream of social media communications, and assign or route the communications to agents to analyze the social media communications for providing customer support, feedback, comments, questions, etc. Such social media communications (also referred to herein as "expressions") may be directed, for example, toward the operation, industry, product, customer service, system user, etc. With large volumes of social expressions, depending on the resources of the contact center, it may be difficult or impossible to address each social media expression. Because resources of the contact center are finite, responding to customers' social media expressions in the order that they are received may be less beneficial to businesses and customers alike. For example, the earliest-received social media expression may be less important to the interests of the business in terms of customer satisfaction, reputation, and profitability, than a social media expression received later. Some embodiments of the present invention provide a system and method to enable reordering and reorganization of social media expressions, in terms of when and whether the expressions are routed to agents for handling.

Further, some embodiments of the present invention are directed to a multimedia unified communication and collaboration platform that provides businesses with features to personalize outreach to customers to connect and engage. Businesses supported by the multimedia unified communication and collaboration platforms have the ability to 'Listen', 'Publish', and 'Explore' social media hubs. Examples of social media hubs may include third-party social media platforms such as Facebook®, Twitter®, Snapchat®, LinkedIn®, YouTube®, review sites, web forum threads, blog comments, product ratings on retail-oriented sites, discussion forums, and the like. Discussion forums may occur around a particular context such as a video (e.g., YouTube®), picture album (e.g., Pinterest®), or the like. Supported organizations may be able to monitor and respond to social media hubs using an interface within the unified communication and collaboration platform. In so doing, some embodiments of the present invention provide an additional media type that allows social media interactions to be routed just like any other media type (such as, video chat, messaging, phone call, etc.) in a contact center environment. By integrating social media interactions into a contact center, some embodiments of the present invention may leverage automatic call distribution (ACD), reporting, analytics, and other contact center related features to enhance the experience of supported businesses while making the contact center more efficient.

FIG. 1 is a schematic block diagram of a contact center system 100 operating as part of a social media expression management system 102 for supporting a contact center in providing contact center services according to one example embodiment of the invention. The contact center may be an in-house facility to a business or enterprise for serving the enterprise in performing the functions of sales and services related to the products and services available through the enterprise. In another aspect, the contact center may be operated by a third-party service provider. According to some embodiments, the contact center may operate as a hybrid system in which some components of the contact center system are hosted at the contact center premises and other components are hosted remotely (e.g., in a cloud-based environment). The contact center may be deployed in equipment dedicated to the enterprise or third-party service provider, and/or deployed in a remote computing environment such as, for example, a private or public cloud environment with infrastructure for supporting multiple contact centers for multiple enterprises. The various components of the contact center system may also be distributed across various geographic locations and computing environments and not necessarily contained in a single location, computing environment, or even computing device.

According to one example embodiment, the contact center system manages resources (e.g., personnel, computers, and telecommunications equipment) to enable delivery of services via telephone or other communication mechanisms. Such services may vary depending on the type of contact center, and may range from customer service to help desk, emergency response, telemarketing, order taking, and the like.

Customers, potential customers, or other end users (collectively referred to herein as customers, users or end users) desiring to receive services from the contact center may initiate inbound communications (e.g., telephony calls) to the contact center via their end user devices 108a-108c (collectively referenced as 108). Each of the end user devices 108 may be a communication device conventional in the art, such as, for example, a telephone, wireless phone, smartphone, personal computer, electronic tablet, and/or the like. Users operating the end user devices 108 may initiate, manage, and respond to telephone calls, emails, chats, text messaging, web-browsing sessions, and other multimedia transactions.

Inbound and outbound communications from and to the end user devices 108 may traverse a telephone, cellular, and/or data communications network 110 depending on the type of device that is being used. For example, the communications network 110 may include a private or public switched telephone network (PSTN), local area network (LAN), private wide area network (WAN), and/or public wide area network such as, for example, the Internet. The communications network 110 may also include a wireless carrier network including a code division multiple access (CDMA) network, global system for mobile communications (GSM) network, or any wireless network/technology conventional in the art, including but to limited to 3G, 4G, LTE, and the like.

According to one example embodiment, the contact center system includes a switch/media gateway 112 coupled to the communications network 110 for receiving and transmitting telephony calls between end users and the contact center. The switch/media gateway 112 may include a telephony switch or communication switch configured to function as a central switch for agent level routing within the center. The switch may be a hardware switching system or a soft switch implemented via software. For example, the switch 112 may include an automatic call distributor, a private branch exchange (PBX), an IP-based software switch, and/or any other switch with specialized hardware and software configured to receive Internet-sourced interactions and/or telephone network-sourced interactions from a customer, and route those interactions to, for example, an agent telephony or communication device. In this example, the switch/media gateway establishes a voice path/connection (not shown) between the calling customer and the agent telephony device, by establishing, for example, a connection between the customer's telephony device and the agent telephony device.

According to one exemplary embodiment of the invention, the switch is coupled to a call controller 118 which may, for example, serve as an adapter or interface between the switch and the remainder of the routing, monitoring, and other communication-handling components of the contact center.

The call controller 118 may be configured to process PSTN calls, VoIP calls, and the like. For example, the call controller 118 may be configured with computer-telephony integration (CTI) software for interfacing with the switch/media gateway and contact center equipment. In one embodiment, the call controller 118 may include a session initiation protocol (SIP) server for processing SIP calls. According to some exemplary embodiments, the call controller 118 may, for example, extract data about the customer interaction such as the caller's telephone number, often known as the automatic number identification (ANI) number, or the customer's Internet protocol (IP) address, or email address, and communicate with other CC components in processing the interaction.

According to one exemplary embodiment of the invention, the system further includes an interactive media response (IMR) server 122, which may also be referred to as a self-help system, virtual assistant, or the like. The IMR server 122 may be similar to an interactive voice response (IVR) server, except that the IMR server 122 is not restricted to voice, but may cover a variety of media channels including voice. Taking voice as an example, however, the IMR server 122 may be configured with an IMR script for querying customers on their needs. For example, a contact center for a bank may tell customers, via the IMR script, to "press 1" if they wish to get an account balance. If this is the case, through continued interaction with the IMR server 122, customers may complete service without needing to speak with an agent. The IMR server 122 may also ask an open ended question such as, for example, "How can I help you?" and the customer may speak or otherwise enter a reason for contacting the contact center. The customer's response may then be used by a routing server 124 to route the call or communication to an appropriate contact center resource.

If the communication is to be routed to an agent, the call controller 118 interacts with the routing server (also referred to as an orchestration server) 124 to find an appropriate agent for processing the interaction. The selection of an appropriate agent for routing an inbound interaction may be based, for example, on a routing strategy employed by the routing server 124, and further based on information about agent availability, skills, and other routing parameters provided, for example, by a statistics server 132.

In some embodiments, the routing server 124 may query a customer database, which stores information about existing clients, such as contact information, service level agreement (SLA) requirements, nature of previous customer contacts and actions taken by contact center to resolve any customer issues, and the like. The database may be, for example, Cassandra or any NoSQL database, and may be stored in a mass storage device 126. The database may also be a SQL database and may be managed by any database management system such as, for example, Oracle, IBM DB2, Microsoft SQL server, Microsoft Access, PostgreSQL, MySQL, FoxPro, and SQLite. The routing server 124 may query the customer information from the customer database via an ANI or any other information collected by the IMR server 122.

Once an appropriate agent is identified as being available to handle a communication, a connection may be made between the customer and an agent device 130a-130c (collectively referenced as 130) of the identified agent. Collected information about the customer and/or the customer's historical information may also be provided to the agent device for aiding the agent in better servicing the communication. In this regard, each agent device 130 may include a telephone adapted for regular telephone calls, VoIP calls, and the like. The agent device 130 may also include a computer for communicating with one or more servers of the contact center and performing data processing associated with contact center operations, and for interfacing with customers via voice and other multimedia communication mechanisms.

The contact center system may also include a multimedia/social media server 154 for engaging in media interactions other than voice interactions with the end user devices 108 and/or web servers 120. The media interactions may be related, for example, to email, vmail (voice mail through email), chat, video, text-messaging, web, social media, co-browsing, and the like. In this regard, the multimedia/social media server 154 may take the form of any IP router conventional in the art with specialized hardware and software for receiving, processing, and forwarding multimedia events.

According to some example embodiments, the multimedia/social media server 154 may be configured to receive a stream of social media expressions, by way of a publicly accessible application programming interface (API), from one or more third-party or internal social media platforms (e.g., a server operated by or corresponding to the social media platforms). Thus, according to some example embodiments, as will be described in more detail below, the multimedia/social media server 154 may operate to facilitate communications between the contact center system (or agents of the contact center system) and customers who are engaged with third-party or internal social media platforms. According to some embodiments, the multimedia/social media server 154 may include or be connected to a memory or buffer for storing social media expressions or communications (and/or information about social media expressions or communications, such as user profile information, communication content, user interaction history, and the like).

The web servers 120 may include, for example, social interaction site hosts for a variety of known social interaction sites to which an end user may subscribe, such as, for example, Facebook®, Twitter®, and the like. In this regard, although in the embodiment of FIG. 1 the web servers 120 are depicted as being part of the contact center system, the web servers may also be provided by third parties and/or maintained outside of the contact center premise. The web servers may also provide web pages for the enterprise that is being supported by the contact center. End users may browse the web pages and get information about the enterprise's products and services. The web pages may also provide a mechanism for contacting the contact center, via, for example, web chat, voice call, email, web real time communication (WebRTC), or the like.

According to one exemplary embodiment of the invention, in addition to real-time interactions, deferrable (also referred to as back-office or offline) interactions/activities may also be routed to the contact center agents. Such deferrable activities may include, for example, responding to emails, responding to letters, attending training seminars, or any other activity that does not entail real time communication with a customer. In this regard, an interaction (iXn) server 156 interacts with the routing server 124 for selecting an appropriate agent to handle the activity. Once assigned to an agent, an activity may be pushed to the agent, or may appear in the agent's workbin 136a-136c (collectively referenced as 136) as a task to be completed by the agent. The agent's workbin may be implemented via any data structure conventional in the art, such as, for example, a linked list, array, and/or the like. The workbin 136 may be maintained, for example, in buffer memory of each agent device 130.

According to one exemplary embodiment of the invention, the mass storage device(s) 126 may store one or more databases relating to agent data (e.g., agent profiles, schedules, etc.), customer data (e.g., customer profiles), interaction data (e.g., details of each interaction with a customer, including reason for the interaction, disposition data, time on hold, handle time, etc.), and the like. According to one embodiment, some of the data (e.g., customer profile data) may be maintained in a customer relations management (CRM) database hosted in the mass storage device 126 or elsewhere. The mass storage device may take form of a hard disk or disk array as is conventional in the art.

According to some embodiments, the contact center system may include a universal contact server (UCS) 127, configured to retrieve information stored in the CRM database and direct information to be stored in the CRM database. The UCS 127 may also be configured to facilitate maintaining a history of customers' preferences and interaction history, and to capture and store data regarding comments from agents, customer communication history, and the like.

The contact center system may also include a reporting server 134 configured to generate reports from data aggregated by the statistics server 132. Such reports may include near real-time reports or historical reports concerning the state of resources, such as, for example, average waiting time, abandonment rate, agent occupancy, and the like. The reports may be generated automatically or in response to specific requests from a requestor (e.g., agent/administrator, contact center application, and/or the like).

The various servers of FIG. 1 may each include one or more processors executing computer program instructions and interacting with other system components for performing the various functionalities described herein. The computer program instructions are stored in a memory implemented using a standard memory device, such as, for example, a random access memory (RAM). The computer program instructions may also be stored in other non-transitory computer readable media such as, for example, a CD-ROM, flash drive, or the like. Also, although the functionality of each of the servers is described as being provided by the particular server, a person of skill in the art should recognize that the functionality of various servers may be combined or integrated into a single server, or the functionality of a particular server may be distributed across one or more other servers without departing from the scope of the embodiments of the present invention.

In the various embodiments, the terms "interaction" and "communication" are used interchangeably, and generally refer to any real-time and non-real time interaction that uses any communication channel including, without limitation, social media expressions or communications, telephony calls (PSTN or VoIP calls), emails, vmails (voice mail through email), video, chat, screen-sharing, text messages, social media messages, web real-time communication (e.g., WebRTC calls), and the like.

Figure 2:
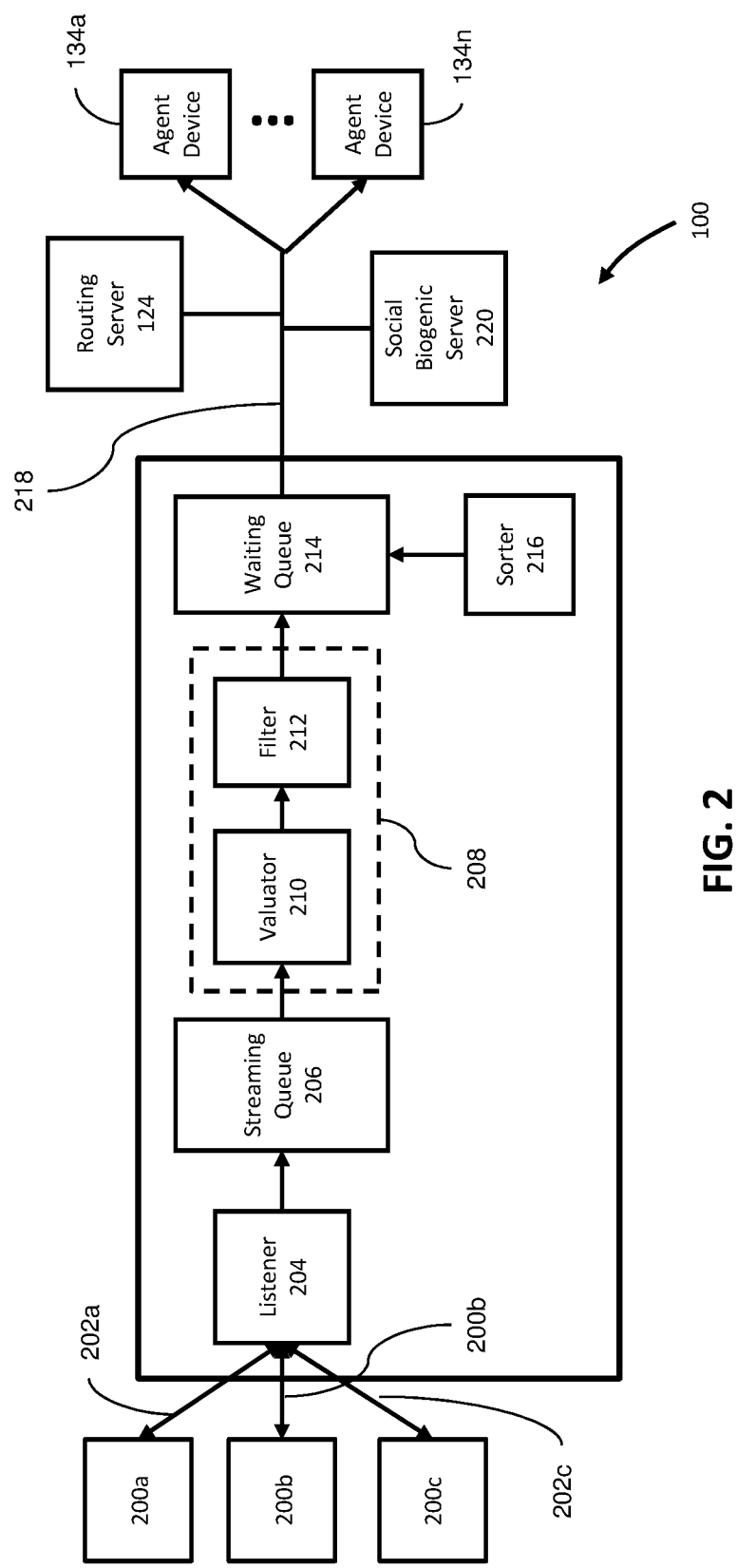
FIG. 2 is a block diagram illustrating further details of the contact center management system, according to some example embodiments of the present invention.

FIG. 2 is a block diagram illustrating further details of the social media expression management system 102, according to some example embodiments of the present invention.

As illustrated in FIG. 2, the contact center system 100, operating as part of the social media expression management system 102, may be in electronic communication with one or more third-party (or internal) social media platforms (also referred to as social channels, social media hubs, or social networks) 200a-200c (the number of social media platforms is not limited to the number illustrated in FIG. 2, and may include any suitable number and variety of social media platforms according to the design of the social media expression management system 102). Although embodiments of the present invention are described with the multimedia/social media server 154 controlling the social media expression reorganization and routing to agents, embodiments of the present invention are not limited thereto, and various aspects or features may be executed by other elements or components of the contact center system 100.

As illustrated in FIG. 2, the contact center system 100 and/or the multimedia/social media server 154 is configured to receive expression streams (also referred to as communication or data streams) 202a-202c through the social media platforms 200a-200c, respectively, for example, by way of a publicly available application programming interface (API). Each social media platform 200a-200c may have its own unique mechanism or protocol to allow the contact center system 100 and/or the multimedia/social media server 154 to "listen" to (e.g., subscribe for and receive) social media expressions that relate to the business or organization supported by the contact center system 100. For example, if a user of one of the social media platforms 200a-200c mentions the organization supported by the contact center system 100 (by, e.g., including a screen name or address associated with the organization in the social media expression) or a product or service provided by the organization, the social media platform may identify the social media expression as being relevant to the organization by matching a subscription query provided through the API and transmit the social media expression to the contact center system 100 and/or the multimedia/social media server 154 as part of the expression stream. The particular mechanism or protocol for identifying and transmitting social media expressions from a social media platform to the contact center system 100 may vary according to the design and function of the social media platform and/or the contact center system 100. The social media expressions may be received by the contact center system 100 and/or the multimedia/social media server 154 via an always-on connection (e.g., a live feed or a web socket).

In some embodiments, the contact center system 100 and/or the multimedia/social media server 154 communicates a set of specifications to each of the social media platforms 200a-200c that cause the platforms to trigger and send a matching social expression to the system. The specification may include, for example, a set of keywords that are associated with the organization or its products and services. This may be referred to as passive "listening" by the contact center system 100 and/or the multimedia/social media server 154. However, embodiments of the present invention are not limited thereto, and the contact center system 100 and/or the multimedia/social media server 154 may actively "listen" for social expressions by actively crawling the Internet (e.g., the one or more media platforms 200a-200b) by utilizing Internet bots, for example, to systematically search the Internet for information of interest. Any results are returned to the listener 204.

In some examples, the expression streams 202a-202c communicated to the listener 204 include not only the text of the message containing the phrase of interest, but also include information regarding the time of the expression (e.g., the time stamp of the social media post), location of the expression (e.g., city/state/zip code that the expression originated from), author of the expression (e.g., name, username, social handle, gender, age or age range, number of followers, number of people being followed by the user (herein referred to as "following"), date of last post, frequency of posts, date of membership, etc.), and/or the like.

In some embodiments, the listener 204 is tuned to the information identified by the specifications, and examines the expression streams 202a-202c received from the social media platforms 200a-200c for validity (e.g., relevancy) and distributes the desired information gleaned from the expression streams 202a-202c to other components (e.g., the analyzer 208) of the contact center system 100 and/or the multimedia/social media server 154 for further analysis. In determining the validity of the social expression, the listener 204 may parse the text of the incoming expression streams 202a-202c to determine their relevancy to notions of interest.

For example, an organization supported by the contact center system 100 may be interested in receiving expression streams pertaining to Delta Airlines®, and thus may have identified "delta" as a phrase of interest. A social media post (e.g., a tweet, post, or a user comment) containing the phrase "delta" may trigger a corresponding one of social media platforms 200a-200c to send the social expression containing the phrase "delta" to the listener 204. However, "delta" may be used in speech related to the military, mathematics, kitchen sinks, etc., none of which may be related to Delta Airlines. As such, the listener 204 may then parse the text of the corresponding expression to determine its relevancy to Delta Airlines. In so doing, the listener 204 may search the expression text to find associated terms, such as "airline", "airport", "flight", "check-in", "missed", "luggage", "booking", etc. If any of the associated terms are found, the listener 204 may determine that the social expression is valid (e.g., is relevant or a good match) and add the expression stream to the streaming queue (i.e., a first queue) 206 for later processing. If none of the associated terms are found, the listener 204 may determine that the social expression is not valid (e.g., not relevant or a poor match) and simply ignore or discard it (i.e., not place it in the streaming queue 206). The list of associated terms for each (or each set of) phrases of interest may be defined by the supported organization and may be stored at the contact center system 100 and/or the multimedia/social media server 154. In some embodiments, the relevancy determination of the listener 204 may be based not only on keyword matches but also on other factors including threshold determinations based on one or more of the number of followers, number of posts, geolocation, and/or the like. For example, the listener 204 may deem as relevant only those social expressions that contain a particular keyword (or set of keywords) and for which the corresponding follower count and the number of online posts (e.g., tweets/retweets) are greater than a first predefined threshold and a second predefined threshold, respectively.

While the validity analysis is described as being performed by the listener 204, embodiments of the present invention are not limited thereto, and the analysis may instead be performed by the analyzer 208. In such embodiments, the listener 204 may simply place all incoming expression streams 202a-202c in the streaming queue 206 without any filtering or analysis.

According to some embodiments, the analyzer 208 includes a valuator 210 and a filter (e.g., drop filter) 212 to assign valuations to and filter the expressions stored in the streaming queue 206. The analyzer 208 may analyze the expressions in the streaming queue 206 on a first-in, first-out (FIFO) basis. The valuator 210 processes each of the expressions for valuation. Valuation may be deemed as the act of augmenting the core properties of a single social expression derived from the core properties themselves. The augmenting data is also called a "data derivative". According to some embodiments, the valuator 210 performs different types of valuations, including sentiment scoring, impression scoring, attentiveness, and/or the like.

In some embodiments, the valuator 210 performs sentiment scoring by parsing the text of the social expression and sending it to an internal or third-party service that determines the sentiment score of the text based on based on a sentiment formula or by utilizing a machine learning system (e.g., deep-learning system) trained on scoring sentiment of text. According to some embodiments, the sentiment formula or the training process of any utilized machine learning system is defined or adjusted based on the preferences of the supported organization. For example, a particular supported organization (e.g., a business) may be more sensitive to social expressions with negative sentiment (e.g., complaints about the business or a consumer product) than one with a positive sentiment (e.g., a praise of a consumer product or service), and thus, the valuator 210 may score expressions with negative sentiments higher than those with positive sentiments. The contact center system 100 and/or the multimedia/social media server 154 may give higher routing priority to higher scored expressions than lower scored expressions. In some examples, sentiment scoring of a particular expression may be further based on geolocation of the expression, as words may carry different meanings in different geographical locations. For example, a social expression, such as a tirade, may be scored differently depending on whether it originates in the Northeast or South of the United States. The sentiment formula or deep-learning system may return a set of values that will provide additional values (or data derivatives) to the original social expression. As such, the valuator 210 may apply processing to determine new data to augment the original social expression with; however, the source values come directly from the social expression itself.

In some embodiments, the valuator 210 performs impression scoring using a formula to determine the number of impressions. In some examples, one or more of the social media platforms 200a-200c provide the number of followers a user (i.e., expression author) has as well as the number of people the user is following. In addition, these platforms 200 may also provide the date when the user joined the platform and the user's activity or total count of expressions published (e.g., posted). In some embodiments, an impression valuation (e.g., an impression score) determines the number of impressions a user has over a set period of time. For example, the impression valuation may divide the number of total expressions by the number of weeks/months the user has been a member of the social media platform 200. This may provide an estimate of the number of expressions a user makes every week/month. Then this number may be multiplied by the number of followers the user has to arrive at the impression score or impression valuation. As such, a first social media user who has a 50,000 followers but only tweets once a week (e.g., on average) may have a lower impression score than a second social media user who has a 1000 followers but tweets 100 times a week (e.g., on average). This is because the first social media user has 200,000 impressions per month, while the second social media user has 400,000 impressions per month.

The valuator 210 may perform other types of valuations including: followers to following ratio, in which expressions from users with high number of followers and a lower number of following (e.g., a famous individual such as a from public figures or celebrity) may be scored higher than those from users having low followers and higher following (e.g., a non-famous person); profile engagement score, in which expressions from users with no profile picture, no basic information, and long-time membership are scored differently than expressions from new users with the same or similar levels of uncompleted biographical data; originality score, which compares, for example, the number of retweets with the number of original posts by the user; attentiveness score, which gauges, for example, the response timeliness between an original expression and a response to the expression (also known as response distance). In an example, a user who responds to a social expression by replying or by sharing (e.g., retweet) within 5 minutes would be given a higher valuation than one who does so in 24 hours. However, embodiments of the present invention are not limited thereto, and the valuator 210 may generate one or more valuations that are derived from the above scores. For example, a particular valuation score may be based on a combination of the follower/following ratio valuation with the attentiveness and profile engagement valuations.

According to some embodiments, the valuator 210 augments the original social expression by adding each of the calculated valuation scores as a derivative property of the original social expression. These derivative properties may be utilized by the contact center system 100 and/or the multimedia/social media server 154 to aid in future decision-making processes.

In some embodiments, the filter 212 analyzes the expressions in the streaming queue 206 to identify those expressions that are worth following up on by routing to an agent of the contact center system 100, and discarding (e.g., ignoring) the rest. In other words, the filter 212 may be utilized as a drop filter capable of identifying and discarding the least valuable expressions in the streaming queue 206, and pushing forward the remaining expressions for further processing (e.g., for routing to an available agent). The filter 212 may filter out (e.g., discard) expressions based on one or more of geolocation of expression, time of origination, gender of expression author, one or more valuations scores, and/or the like. For examples, the filter 212 may discard expressions originating in geolocations that are distant from the supported businesses are of operation (e.g., a US company may desire to disregard/ignore expressions originating in Spain).

In some embodiments, the filter 212 performs raw value comparisons between the valuation scores and corresponding threshold values, and discards those expressions whose valuation scores fall below the corresponding thresholds. For example, the filter 212 may discard (e.g., drop or ignore) those expressions whose follower/following ratio is less than a first preset threshold and/or whose number of impressions per month is lower than a second present threshold (e.g., 50,000). In some embodiments, the filter 212 may compare various valuation scores of a given expression in determining whether or not to discard the expression. For example, the filter 212 may discard an expression whose profile engagement score is greater than the impressions score. However, embodiments of the filter 212 are not limited to raw value comparisons, and in some embodiments, the filter 212 utilizes machine learning (e.g., a deep-learning system) that has been trained to identify and discard the least valuable expressions. According to some embodiments, the filter 212 may also determine not to apply the drop filter if the number of expressions in the waiting queue 214 has not reached a threshold such as a ratio of the number of expressions to the number of agents available to engage with expressions.

According to some embodiments, the analyzer 208 places any expressions from the streaming queue 206, which were not discarded by the filter 212, in a waiting queue (i.e., a second queue) 214 for further processing and routing.

According to some embodiments, the sorter 216 prioritizes the expressions queued in the waiting queue 214 based on importance (e.g., business value). As the volume of incoming social expressions may be high, reorganizing the order of incoming social media expressions according to the unique business interests of the supported organization benefit it, by enabling the highest priority social media expressions to be addressed before lower priority social media expressions.

The sorter 216 may, at regular intervals (e.g., every 30 minutes), sort the expressions in the waiting queue according to a deep-learning system that has been taught to determine the importance of expressions through agent choice. A more detailed description of this sorting machine learning system is provided in U.S. patent application Ser. No. 15/815,660, entitled "SYSTEM AND METHOD FOR MANAGING CONTACT CENTER SYSTEM", filed in the United States Patent and Trademark Office on Nov. 16, 2017, the entire content of which is incorporated herein by reference.

After reorganizing the social media expressions according to their relative importance or priority according to the business interests of the contact center, the contact center system 100 (e.g., the routing server 124) may then route the social media expressions to contact center agent devices according to the relative ranking or order of the social media expressions. Thus, rather than routing social media expressions to agents according to the time that such social media expressions are received (e.g., first-in, first-out), the contact center system 100 may enable routing and handling of the social media expressions according to business interest priority. Ranking of incoming social media expressions according to their relative priority or importance to business interests may enable the contact center to reduce or maintain relatively low overhead (e.g., by employing fewer agents) while ensuring that the highest priority social media expressions are routed to an agent for handling (e.g., responding to customer complaints and questions, fulfilling customer requests, etc.).

For example, in the context of a contact center system that supports a business, the business may wish to ensure that high value or important customers are happy and that any of their concerns or questions are answered by an agent. In such instances, the business may be willing to accept that certain customers' concerns or questions may not be routed to an agent for handling. As another non-limiting example, if the contact center supports an organization such as a charity, political organization, or fundraising entity, the organization may wish to ensure that larger donors' communications are prioritized over those of smaller donors.

In some embodiments, the contact center system 100 (e.g., the routing server 124) organizes and routes expressions in the waiting queue 214 according to a routing strategy, which may be defined or informed by the supported organization. For example, the routing strategy may indicate routing those expressions with a negative sentiment to a particular agent queue for handling by agents who, for example, specialize in, or have received training in, handling negative expressions. Further, a routing strategy may indicate that expressions directed to a particular product or service be directed to a particular agent queue for handling by agents who, for example, specialize in, or have received training in, handling expressions related to the particular product or service. In some examples, expressions that are viral (as determined based on a measurement, such as the number of impressions in a week, which may be defined by the supported organization), may be directed to a "viral" queue for handling.

According to some embodiments, the contact center system 100 (e.g., the routing server 124) routed an expression in the waiting queue 214 to a specific agent queue for handling when expression's origination time is within a defined period of time or a defined geolocation. Routing based on geolocation may be desirable as, for example, people in the South may prefer a particular type of customer service, and people in the North may prefer agents with particular characteristics (e.g., Southerners may prefer or expect certain pleasantries, while New Yorkers may prefer faster speaking agents).

The routing strategy may further indicate that, in some contexts, expressions by male authors should be routed to female agents, and expressions by females should be routed to male agents, or female agents who are older, to increase the potential for a particular business outcome.

The routing strategy may also call for a delay in the routing of expressions to agents. For example, the contact center system 100 (e.g., the routing server 124) may wait to handle expressions communicated on weekends until the following Monday.

According to some examples, when routing expressions in the waiting queue 214 to available agents, the contact center system 100 may match the reorganized expressions to a best available agent. In so doing, the contact center system 100 may reserve a particular expression for a best fit agent who is currently fully occupied with other tasks but who is expected to become available within a preset period of time (e.g., within 5 minutes). The contact center system 100 may also employ a system of checks to ensure that the reservation isn't kept perpetually should the estimated availability of the agent expire.

According to some example embodiments, when an expression 218 from the waiting queue 214 is routed to an agent device 134 for handling by an agent, additional contextual information as well as one or more suggested responses may also be transmitted for display along with the expression 218 itself. For example, according to some embodiments, information about the user or customer (e.g., user profile information, interaction history, purchase history, demographic information, etc.) who transmitted or created the social media expression may be transmitted for display along with the expression 218. Contextual data may also include information reflecting the general state of social expressions in aggregate, such as the number of expressions this hour compared to the previous hour as a measure of traffic or virality, number of incoming expressions for past days at this hour, number of expressions in the last 4 hours that are similar such as using a particular hashtag, number of expressions this hour from a particular time zone or region, and/or the like.

According to some embodiments, the social biogenic server 220 provides a social biogenic deep-learning system to assist agents in performing their tasks using context and suggested responses.

In some embodiments, the social biogenic server 220 utilizes a plurality of models (e.g., statistical models), each of which correlates a plurality of expression feature vectors related to an expression with a plurality of candidate textual blocks that form a part of a suggested response. By utilizing the model and a machine learning algorithm, such as one of various known regression or back-propagation algorithms, the social biogenic server 220 formulates one or more suggested responses to address a given expression. The one or more suggested responses are presented on the display of an agent device 134 to which an expression is routed. An agent may then choose to use one of the suggested responses to respond to the expression, may choose to edit a suggested response in an appropriate manner before publishing it or sending it out, or may ignore all suggested responses and draft an appropriate response based on the expression and the contextual data presented on the display. The approach adopted by the agent as well as the final text of the submitted/published response is recorded by the social biogenic server 220 to be later used for machine learning training purposes.

In some embodiments, the plurality of models correspond to neural networks and/or deep neural networks (a deep neural network being a neural network that has more than one hidden layer, for use with deep-learning techniques), and the process of generating the models may involve training the deep neural networks using training data and an algorithm, such as a back-propagation algorithm. In this regard, each model is invoked to generate a section of the suggested response. The section may be a greeting or opening section, a main body of the suggested response, or a closing section (e.g., goodbye).

Each of the models may include a set of weights for each of the parameters of a linear regression model, or the models may include a set of weights for connections between the neurons of a trained neural network. In some embodiments, a particular expression feature vector is supplied to each model as a value to the input layer of the neural network, and the value (or a set of intermediate values) is forward propagated through the neural network to generate an output, where the output corresponds to a formulation of a section of the suggested response, given the particular input expression feature vector.

According to some examples, each expression feature vector includes one or more of a gender of the user, a geolocation of the communication, a time of the communication, a text of the communication, an originality of the communication (e.g., retweet vs. original tweet, or a like/dislike vs. an original comment), a sentiment score of the communication, a response distance of the communication from last response to the social expression, a known past activity of the user, an impression valuation rating of the user, and biographical data of the user.

In analyzing the expressions and the associated data (e.g., derivate data), the social biogenic server 220 may gain certain insights from the data. Some examples of these insights may be expressed as "males in the South say thank you more than females in the North"; "'cya' is used as a goodbye term in the West for users between the ages of (x) and (y), while 'ciao' is used in Europe between the ages of (x) and (y)"; "females tend to say thank you more than males overall"; "males in the South say thank you more than females in the North"; "people who retweeted posts about cats also expressed themselves about Star Wars and did so between the hours of 8 am and 10 am in the PST time zone"; "followers of 'AwesomeUser' tended to be involved with soccer"; "users who expressed themselves about vitamins tended to be followed by users who expressed themselves in the Northeast after business hours"; "when #LoveChocolate was provided in an original expression, it has been learned that female users above the age of 30 are highly expected to respond within 15 minutes while any age below the age of 20 may respond more weakly and after 24 hours; etc.

Armed with a breadth of hidden knowledge discovered through the learning process of the social biogenic server 220, the contact center system 100 may utilize that knowledge to assist the agent in how to respond to a given social expression. For example, in response to an expression from "AwesomeUser", the social biogenic server 220 may formulate a suggested response that recites: "Howdy AwesomeUser. We love teamwork—just like in soccer. We can help your problem quickly. Glad you reached out. Cya." The social biogenic server 220 may arrive at the formulation based on the following insights: 1) the system may not have learned AwesomeUser's natural greeting, but AwesomeUser lives in a region of the world where the most common greeting by that user's age group is 'Howdy'; 2) 'Cya' may be chosen because AwesomeUser always uses that term in his expressions even though his region doesn't support that term as a goodbye; and 3) AwesomeUser doesn't express about soccer directly, but the next best statement to reference is that of the followers that AwesomeUser tends to attract, and soccer was strongly associated in other learning samples with the text/content that AwesomeUser tends to express about.

Accordingly, the social biogenic server 220 according to some embodiments enables a blended agent/artificial intelligence (A.I.) environment by which social expressions may be addressed in an appropriate and expedient manner.

Leveraging analytics can allow the contact center system 100 to learn more about the supported organization's customer base. For example, data mining may be used in a scenario where the social media accounts of the customer base are monitored. Data mining may be used to "listen" for particular words and aggregate these users which are using the same set. The words may be defined by the contact center system 100 or the supported organization. For example, "Yes on 4000" may illuminate constituent interest in political movements. The phrase "I bought" may be an example of consumerism interests. The hashtag '#SuperBowlCommercial' may be an example of message saturation and virility.

Data may be obtained from this set to learn about the base of customers. For example, constituents most vocal for "Yes on 4000" may make up 80% of interest that are not even geographically expressing themselves in the affected region. Of those, 75% discuss matters that are against the amendment's goals. Further, with the phrase "I bought", the contact center system 100 may identify that 30% of the expressions were affiliated with baby food, 20% with houses, and 5% with farms. Regarding the hashtag '#SuperBowlCommercial', the hashtag may show a spike that started in Oregon and North Dakota and was made up of 80% females (not males). It may be further observed that the particular commercial continued to resonate with females through to October while other hashtags died off within the first week of the conclusion of the Super Bowl event.

In an example, the behavior of the customers may be examined over a period of time. Expressions may expose more data than just raw values of a single tweet/post/like. It may be discovered that the regional geography of these expressions are generally negative or generally positive in sentiment. It may be found that the '#SuperBowlCommercial' hashtag not only resonated with females, but the aggregate words having affinity with those posts also indicated what other values they possess—thus it may be deduced that this commercial (supposedly about the cloud) resonated with the portrayal of Rosie the Riveter in an unexpected way—e.g., the commercial inspired business owners to care for their employees.

The phrase "I bought" may provide insight that people who purchased particular identified items were doing so in a specific band of time. For example, yogurt @ 3 am has affinity with pregnancy, while buying farms has a strong affinity with life insurance and new Cadillacs and regionally @ 8 pm in the east and @ 1 pm in the West.

Every expression may be viewed as a sample of time, space, emotion, and thought—not to mention explicit connections to other people and websites. Whom a person follows and the aggregate people that follow the person are telling as human behavioral samples continue to assemble a social biogenic profile.

Services may be provided back to these customers based on this data. In general, behavioral analysis may be gleaned from studying the social expressions of customers and shared with other clients. For example, Client 1 may discover that a given Twitter user lives at a given address. This information may not be shared with Clients 2-100 directly, but may be generalized for sharing in the following example: "Within the geolocation 11:22, 30% of males express themselves about exercise between 9 am and 10 am. These same males have an affinity with Jeeps and investments. This behavior has shifted from a year ago when this region had 25% of males expressing themselves about the same things and between 8 am and 9 am."

The aggregate information from all of the clients may thus be generalized and then the derivatives of the data sold to all of the clients for a leveraged return.

Herein, the term "social biogenics" may refer to any form of behavioral analysis through the study of social expressions, while "data derivatives" may refer to generating inferenced data from existing data. An example of data derivatives includes a search performed of data, raw data extracted, and the extracted raw data is then used for a secondary search. Patterns may be analyzed in the social data in order to see how, for example, a person from the Midwest United States behaves differently than a person from that same demographic in the Southern United States. The social biogenics include a behavioral map from patterns within all of the data which provide insights into group personas and individual personas.

In some embodiments, search requirements A, B, and C may be used in a search of all social expressions for a customer base. A large number of results may be returned including handles, geolocation, the actual text of the expression, relational information such as a parent like/retweet/+1/comment, and, additionally, information on the user including handle, followers, and gender.

The information may be analyzed by word and phrase usage. Then, grouping may be performed by geolocation and gender. A new body of data may be derived from the initial set. The data may then be aggregated by time to gain insights on when people feel the need to express themselves about such things. For example, in the restaurant industry, people may be more inclined to provide feedback on a meal around common meal-time hours. In the travel industry, people may be more inclined to provide feedback around Federal holidays or religious holidays.

Derivative relationships may be created from this information to find connections between products and user demographics, such as, for example, soccer moms in the Midwest enjoy discussions of science fiction while soccer moms in the South enjoy discussions of musicals.

Figure 3:
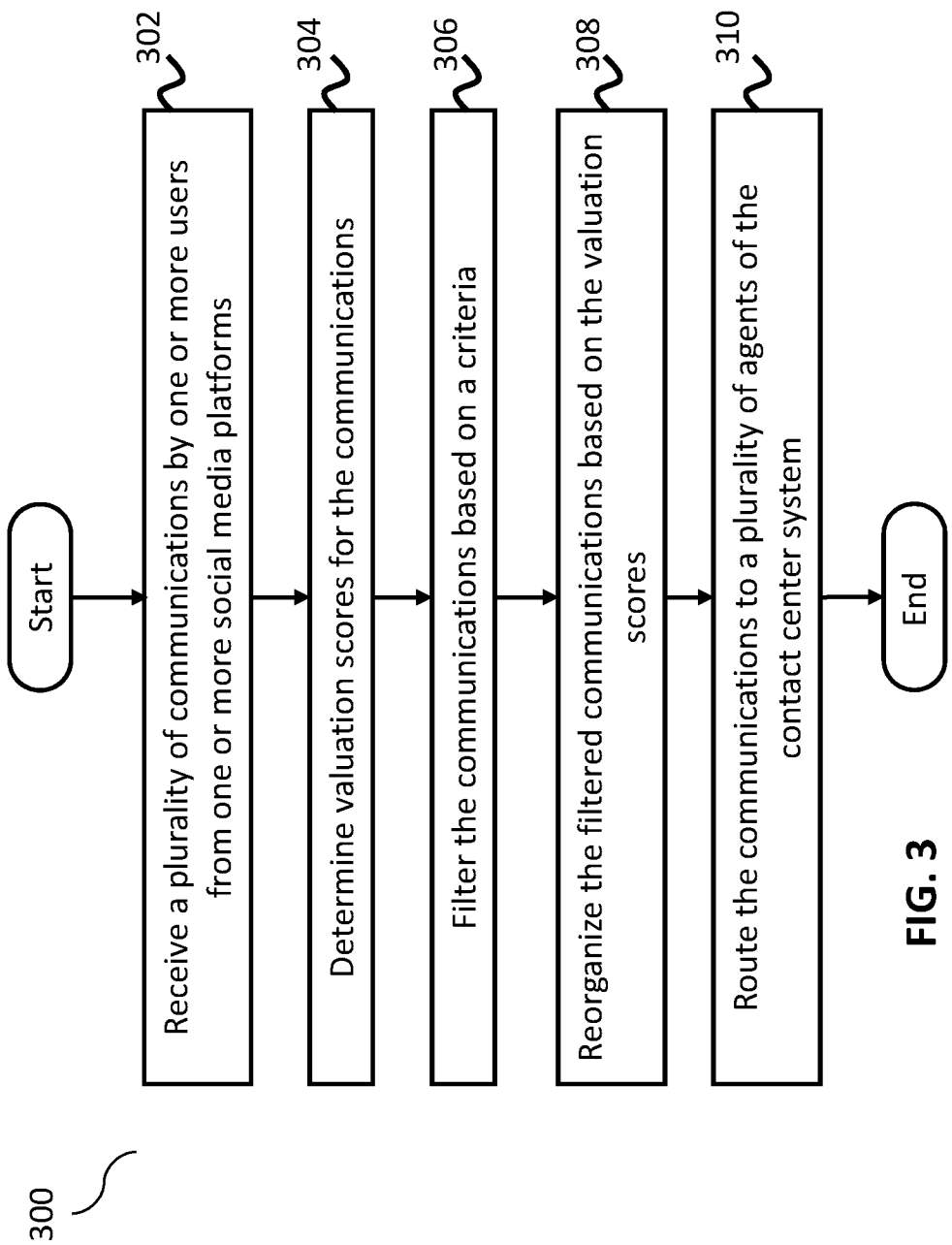
FIG. 3 is a flow chart illustrating a process for managing social media communications of an organization supported by a contact center system, according to some example embodiments of the present invention.

FIG. 3 is a flow chart illustrating a process 300 for managing social media communications of an organization supported by a contact center system, according to some example embodiments of the present invention.

In block 302, the contact center system 100 and/or the multimedia/social media server 154 receives a plurality of communications (e.g., social media expressions) 202a/b/c by one or more users from one or more social media platforms 200a/b/c.

In block 304, the contact center system 100 and/or the multimedia/social media server 154 determines valuation scores (e.g., sentiment scores, impression scores, etc.) for the communications (e.g., social media expressions) 202a/b/c.

In block 306, the contact center system 100 and/or the multimedia/social media server 154 filters the communications based on a criteria.

In block 308, the contact center system 100 and/or the multimedia/social media server 154 reorganizes the filtered communications based on the valuation scores, and, in block 310, routes the communications to a plurality of agents of the contact center system.

In one embodiment, each of the various servers, controllers, switches, gateways, engines, and/or modules (collectively referred to as servers) in the afore-described figures are implemented via hardware or firmware (e.g., ASIC), as will be appreciated by a person of skill in the art.

In one embodiment, each of the various servers, controllers, engines, and/or modules (collectively referred to as servers) in the afore-described figures may be a process or thread, running on one or more processors, in one or more computing devices 1500 (e.g., FIG. 4A, FIG. 4B), executing computer program instructions and interacting with other system components for performing the various functionalities described herein. The computer program instructions are stored in a memory, which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that a computing device may be implemented via firmware (e.g., an application-specific integrated circuit), hardware, or a combination of software, firmware, and hardware. A person of skill in the art should also recognize that the functionality of various computing devices may be combined or integrated into a single computing device, or the functionality of a particular computing device may be distributed across one or more other computing devices without departing from the scope of the exemplary embodiments of the present invention. A server may be a software module, which may also simply be referred to as a module. The set of modules in the contact center may include servers and other modules.

The various servers may be located on a computing device on-site at the same physical location as the agents of the contact center or may be located off-site (or in the cloud) in a geographically different location, such as, for example, in a remote data center, connected to the contact center via a network such as the Internet. In addition, some of the servers may be located in a computing device on-site at the contact center, while others may be located in a computing device off-site, or servers providing redundant functionality may be provided both via on-site and off-site computing devices to provide greater fault tolerance. In some embodiments of the present invention, functionality provided by servers located on computing devices off-site may be accessed and provided over a virtual private network (VPN) as if such servers were on-site, or functionality may be provided using a software as a service (SaaS) to provide functionality over the Internet using various protocols, such as by exchanging data encoded in extensible markup language (XML) or JavaScript Object notation (JSON).

Figure 4A:
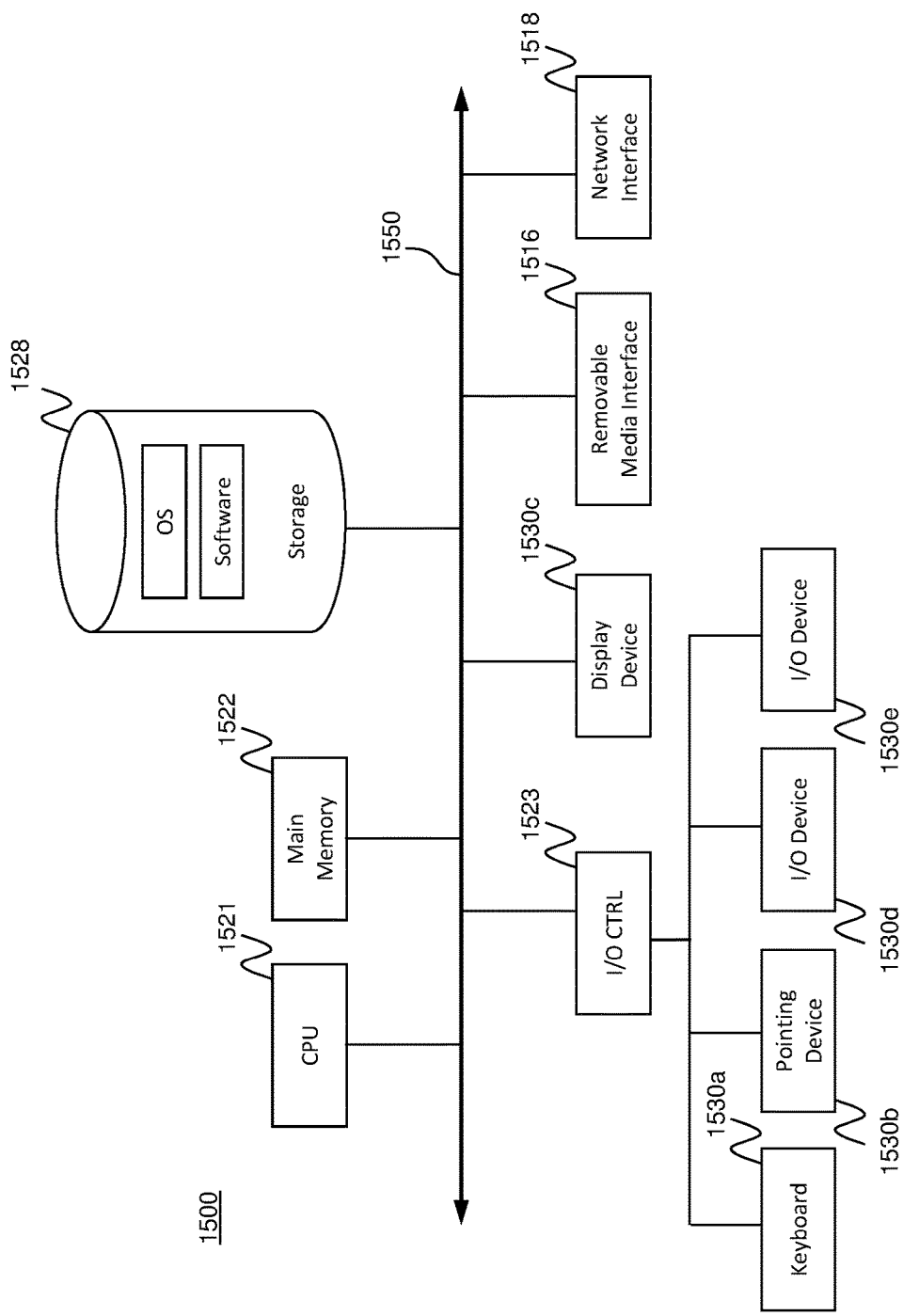
FIG. 4A is a block diagram of a computing device according to an embodiment of the present invention.
Figure 4B:
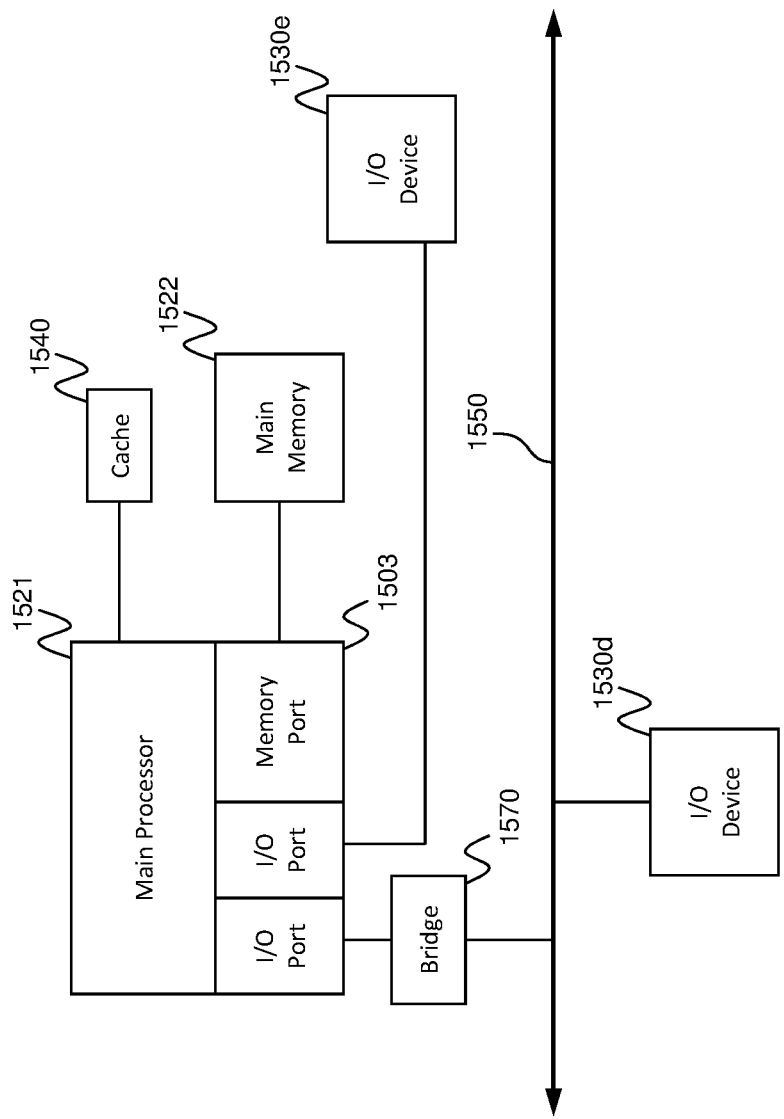
FIG. 4B is a block diagram of a computing device according to an embodiment of the present invention.

FIG. 4A and FIG. 4B depict block diagrams of a computing device 1500 as may be employed in exemplary embodiments of the present invention. Each computing device 1500 includes a central processing unit 1521 and a main memory unit 1522. As shown in FIG. 4A, the computing device 1500 may also include a storage device 1528, a removable media interface 1516, a network interface 1518, an input/output (I/O) controller 1523, one or more display devices 1530c, a keyboard 1530a and a pointing device 1530b, such as a mouse. The storage device 1528 may include, without limitation, storage for an operating system and software. As shown in FIG. 4B, each computing device 1500 may also include additional optional elements, such as a memory port 1503, a bridge 1570, one or more additional input/output devices 1530d, 1530e and a cache memory 1540 in communication with the central processing unit 1521. The input/output devices 1530a, 1530b, 1530d, and 1530e may collectively be referred to herein using reference numeral 1530.

The central processing unit 1521 is any logic circuitry that responds to and processes instructions fetched from the main memory unit 1522. It may be implemented, for example, in an integrated circuit, in the form of a microprocessor, microcontroller, or graphics processing unit (GPU), or in a field-programmable gate array (FPGA) or application-specific integrated circuit (ASIC). The main memory unit 1522 may be one or more memory chips capable of storing data and allowing any storage location to be directly accessed by the central processing unit 1521. As shown in FIG. 4A, the central processing unit 1521 communicates with the main memory 1522 via a system bus 1550. As shown in FIG. 4B, the central processing unit 1521 may also communicate directly with the main memory 1522 via a memory port 1503.

FIG. 4B depicts an embodiment in which the central processing unit 1521 communicates directly with cache memory 1540 via a secondary bus, sometimes referred to as a backside bus. In other embodiments, the central processing unit 1521 communicates with the cache memory 1540 using the system bus 1550. The cache memory 1540 typically has a faster response time than main memory 1522. As shown in FIG. 4A, the central processing unit 1521 communicates with various I/O devices 1530 via the local system bus 1550. Various buses may be used as the local system bus 1550, including a Video Electronics Standards Association (VESA) Local bus (VLB), an Industry Standard Architecture (ISA) bus, an Extended Industry Standard Architecture (EISA) bus, a MicroChannel Architecture (MCA) bus, a Peripheral Component Interconnect (PCI) bus, a PCI Extended (PCI-X) bus, a PCI-Express bus, or a NuBus. For embodiments in which an I/O device is a display device 1530*c*, the central processing unit 1521 may communicate with the display device 1530*c* through an Advanced Graphics Port (AGP). FIG. 4B depicts an embodiment of a computer 1500 in which the central processing unit 1521 communicates directly with I/O device 1530*e*. FIG. 4B also depicts an embodiment in which local busses and direct communication are mixed: the central processing unit 1521 communicates with I/O device 1530*d* using a local system bus 1550 while communicating with I/O device 1530*e* directly.

A wide variety of I/O devices 1530 may be present in the computing device 1500. Input devices include one or more keyboards 1530*a*, mice, trackpads, trackballs, microphones, and drawing tablets. Output devices include video display devices 1530*c*, speakers, and printers. An I/O controller 1523, as shown in FIG. 4A, may control the I/O devices. The I/O controller may control one or more I/O devices such as a keyboard 1530*a* and a pointing device 1530*b*, e.g., a mouse or optical pen.

Referring again to FIG. 4A, the computing device 1500 may support one or more removable media interfaces 1516, such as a floppy disk drive, a CD-ROM drive, a DVD-ROM drive, tape drives of various formats, a USB port, a Secure Digital or COMPACT FLASH™ memory card port, or any other device suitable for reading data from read-only media, or for reading data from, or writing data to, read-write media. An I/O device 1530 may be a bridge between the system bus 1550 and a removable media interface 1516.

The removable media interface 1516 may for example be used for installing software and programs. The computing device 1500 may further include a storage device 1528, such as one or more hard disk drives or hard disk drive arrays, for storing an operating system and other related software, and for storing application software programs. Optionally, a removable media interface 1516 may also be used as the storage device. For example, the operating system and the software may be run from a bootable medium, for example, a bootable CD.

In some embodiments, the computing device 1500 may include or be connected to multiple display devices 1530*c*, which each may be of the same or different type and/or form. As such, any of the I/O devices 1530 and/or the I/O controller 1523 may include any type and/or form of suitable hardware, software, or combination of hardware and software to support, enable or provide for the connection to, and use of, multiple display devices 1530*c* by the computing device 1500. For example, the computing device 1500 may include any type and/or form of video adapter, video card, driver, and/or library to interface, communicate, connect or otherwise use the display devices 1530*c*. In one embodiment, a video adapter may include multiple connectors to interface to multiple display devices 1530*c*. In other embodiments, the computing device 1500 may include multiple video adapters, with each video adapter connected to one or more of the display devices 1530*c*. In some embodiments, any portion of the operating system of the computing device 1500 may be configured for using multiple display devices 1530*c*. In other embodiments, one or more of the display devices 1530*c* may be provided by one or more other computing devices, connected, for example, to the computing device 1500 via a network. These embodiments may include any type of software designed and constructed to use the display device of another computing device as a second display device 1530*c* for the computing device 1500. One of ordinary skill in the art will recognize and appreciate the various ways and embodiments that a computing device 1500 may be configured to have multiple display devices 1530*c*.

A computing device 1500 of the sort depicted in FIG. 4A and FIG. 4B may operate under the control of an operating system, which controls scheduling of tasks and access to system resources. The computing device 1500 may be running any operating system, any embedded operating system, any real-time operating system, any open source operating system, any proprietary operating system, any operating systems for mobile computing devices, or any other operating system capable of running on the computing device and performing the operations described herein.

The computing device 1500 may be any workstation, desktop computer, laptop or notebook computer, server machine, handheld computer, mobile telephone or other portable telecommunication device, media playing device, gaming system, mobile computing device, or any other type and/or form of computing, telecommunications or media device that is capable of communication and that has sufficient processor power and memory capacity to perform the operations described herein. In some embodiments, the computing device 1500 may have different processors, operating systems, and input devices consistent with the device.

In other embodiments the computing device 1500 is a mobile device, such as a Java-enabled cellular telephone or personal digital assistant (PDA), a smartphone, a digital audio player, or a portable media player. In some embodiments, the computing device 1500 includes a combination of devices, such as a mobile phone combined with a digital audio player or portable media player.

Figure 4C:
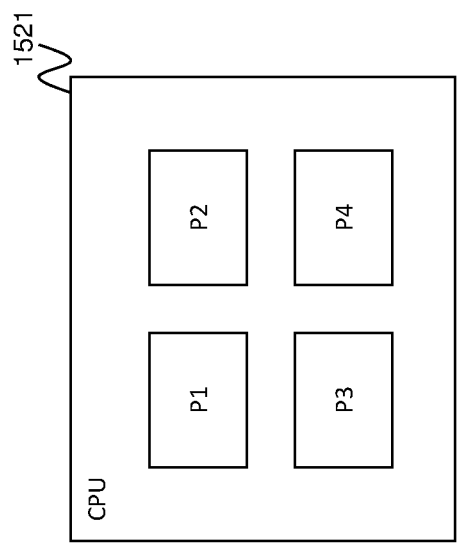
FIG. 4C is a block diagram of a computing device according to an embodiment of the present invention.
Figure 4D:
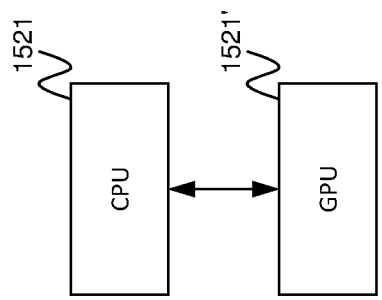
FIG. 4D is a block diagram of a computing device according to an embodiment of the present invention.

As shown in FIG. 4C, the central processing unit 1521 may include multiple processors P1, P2, P3, P4, and may provide functionality for simultaneous execution of instructions or for simultaneous execution of one instruction on more than one piece of data. In some embodiments, the computing device 1500 may include a parallel processor with one or more cores. In one of these embodiments, the computing device 1500 is a shared memory parallel device, with multiple processors and/or multiple processor cores, accessing all available memory as a single global address space. In another of these embodiments, the computing device 1500 is a distributed memory parallel device with multiple processors each accessing local memory only. In still another of these embodiments, the computing device 1500 has both some memory which is shared and some memory which may only be accessed by particular processors or subsets of processors. In still even another of these embodiments, the central processing unit 1521 includes a multicore microprocessor, which combines two or more independent processors into a single package, e.g., into a single integrated circuit (IC). In one exemplary embodiment, depicted in FIG. 4D, the computing device 1500 includes at least one central processing unit 1521 and at least one graphics processing unit 1521'.

In some embodiments, a central processing unit 1521 provides single instruction, multiple data (SIMD) functionality (e.g., execution of a single instruction simultaneously on multiple pieces of data). In other embodiments, several processors in the central processing unit 1521 may provide functionality for execution of multiple instructions simultaneously on multiple pieces of data (MIMD). In still other embodiments, the central processing unit 1521 may use any combination of SIMD and MIMD cores in a single device.

Figure 4E:
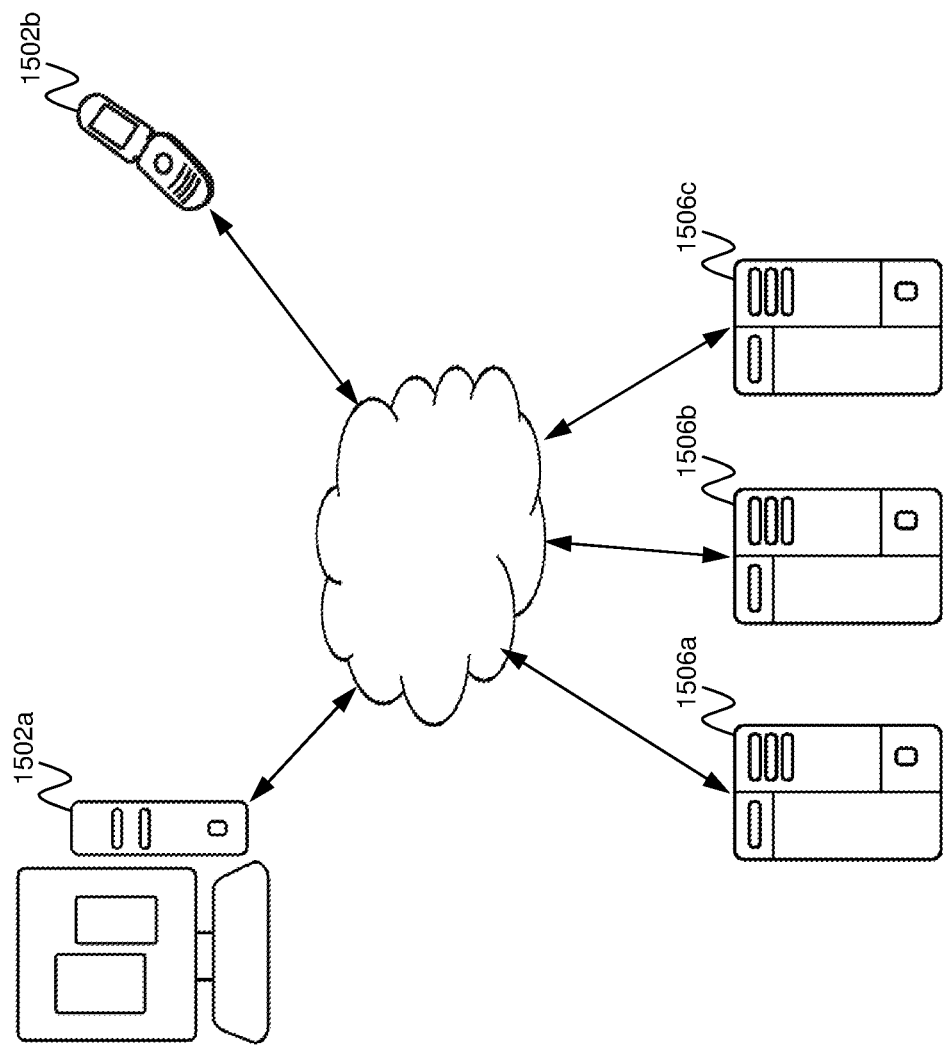
FIG. 4E is a block diagram of a network environment including several computing devices according to an embodiment of the present invention.

A computing device may be one of a plurality of machines connected by a network, or it may include a plurality of machines so connected. FIG. 4E shows an exemplary network environment. The network environment includes one or more local machines 1502a, 1502b (also generally referred to as local machine(s) 1502, client(s) 1502, client node(s) 1502, client machine(s) 1502, client computer(s) 1502, client device(s) 1502, endpoint(s) 1502, or endpoint node(s) 1502) in communication with one or more remote machines 1506a, 1506b, 1506c (also generally referred to as server machine(s) 1506 or remote machine(s) 1506) via one or more networks 1504. In some embodiments, a local machine 1502 has the capacity to function as both a client node seeking access to resources provided by a server machine and as a server machine providing access to hosted resources for other clients 1502a, 1502b. Although only two clients 1502 and three server machines 1506 are illustrated in FIG. 4E, there may, in general, be an arbitrary number of each. The network 1504 may be a local area network (LAN) (e.g., a private network such as a company Intranet), a metropolitan area network (MAN), a wide area network (WAN) (such as the Internet), another public network, or a combination thereof.

The computing device 1500 may include a network interface 1518 to interface to the network 1504 through a variety of connections including, but not limited to, standard telephone lines, local area network (LAN) or wide area network (WAN) links, broadband connections, wireless connections, or a combination of any or all of the above. Connections may be established using a variety of communication protocols. In one embodiment, the computing device 1500 communicates with other computing devices 1500 via any type and/or form of gateway or tunneling protocol, such as Secure Socket Layer (SSL) or Transport Layer Security (TLS). The network interface 1518 may include a built-in network adapter, such as a network interface card, suitable for interfacing the computing device 1500 to any type of network capable of communication and performing the operations described herein. An I/O device 1530 may be a bridge between the system bus 1550 and an external communication bus.

According to one embodiment, the network environment of FIG. 4E may be a virtual network environment where the various components of the network are virtualized. For example, the various machines 1502 may be virtual machines implemented as a software-based computer running on a physical machine. The virtual machines may share the same operating system. In other embodiments, different operating systems may be run on each virtual machine instance. According to one embodiment, a "hypervisor" type of virtualization is implemented, wherein multiple virtual machines run on the same host physical machine, each acting as if it has its own dedicated box. Of course, the virtual machines may also run on different host physical machines.

Other types of virtualization are also contemplated, such as, for example, the network (e.g., via Software Defined Networking (SDN)). Functions, such as functions of the session border controller and other types of functions, may also be virtualized, such as, for example, via Network Functions Virtualization (NFV).

Although this invention has been described in certain specific embodiments, those skilled in the art will have no difficulty devising variations on the described embodiments, which variations in no way depart from the scope and spirit of the present invention. Furthermore, to those skilled in the various arts, the invention itself herein will suggest solutions to other tasks and adaptations for other applications. It is the applicant's intention to cover by claims all such uses of the invention and those changes and modifications which could be made to the embodiments of the invention herein chosen for the purpose of disclosure without departing from the spirit and scope of the invention. Thus, the present embodiments of the invention should be considered in all respects as illustrative and not restrictive, the scope of the invention to be indicated by the appended claims and their equivalents rather than the foregoing description.

What is claimed is:

1. A method of routing social media communication in a contact center system supporting an organization system, the method comprising:
  receiving, by a processor of the contact center, a plurality of 'communications by one or more users, transmitted in a form of data streams, from one or more social media platforms in electronic communication with the contact center;
  determining, by the processor, valuation scores for the communications, the valuation scores comprising sentiment scores corresponding to the communications, the determining the valuation scores comprises:
    determining, by the processor, a geolocation of a communication of the communications to inform meaning of words of the communication;
    parsing, by the processor, a text of the communication; and
    determining, by the processor, a sentiment score of the sentiment scores corresponding to the communication based on the parsed text and the geolocation of the communication;
  filtering, by the processor, the communications based on a criteria;
  reorganizing, by the processor, the filtered communications based on the valuation scores; and
  routing, by the processor, the filtered communications to a plurality of agent devices of the contact center system,
  wherein filtering the communications based on the criteria comprises:
    determining, by the processor, whether to discard one or more of the communications based on the criteria; and
    identifying, by the processor, only non-discarded communications as filtered communications for routing to the plurality of agent devices of the contact center system.

2. The method of claim 1, further comprising:
  buffering, by the processor, the communications received from the one or more social media platforms in a first queue for a first period of time; and analyzing, by the processor, the buffered communications for relevance to the organization based on existence of one or more keywords in corresponding texts of the communications.

3. The method of claim 2, wherein analyzing the communications for relevance is further based on one or more of geolocation of the communications, originations times of the communications, and identities of authors of the communications.

4. The method of claim 1, wherein determining valuation scores for the communications comprises:
determining, by the processor, one or more valuation scores associated with a communication of the plurality of communications based on one or more of a sentiment of the communication, a number of impressions of posts of an author of the communication over a period of time, attentiveness of the author of the communication, number followers of the author of the communication, number of users being followed by the author of the communication, biographical information of the author of the communication, geolocation of the communication, time of the communication, profile engagement of the of the author of the communication, a response distance of the communication.

5. The method of claim 1, wherein determining valuation scores for the communications comprises utilizing a machine learning system to determine one or more valuation scores for each communication of the plurality of communications based on one or more of a sentiment of the communication, a number of impressions of posts of an author of the communication over a period of time, attentiveness of the author of the communication, number followers of the author of the communication, number of users being followed by the author of the communication, biographical information of the author of the communication, geolocation of the communication, time of the communication, profile engagement of the of the author of the communication, a response distance of the communication.

6. The method of claim 1, wherein the criteria comprises one or more of geolocation of expression, time of origination, gender of expression author, one or more valuations scores.

7. The method of claim 1, wherein determining whether to discard comprises:
comparing, by the processor, one or more valuation scores of each one of the communications with one or more associated threshold values; and
discarding, by the processor, a communication of the plurality of communications for which the one or more associated valuation scores is below the one or more associated threshold values.

8. The method of claim 1, wherein reorganizing the filtered communications based on the valuation scores comprises:
buffering, by the processor, the filtered communications in a second queue for a second period of time; and
sorting, by the processor, the filtered communications in the second queue based on the valuation scores.

9. A system for routing social media communication in a contact center system supporting an organization, the system comprising:
a processor; and
a memory coupled to the processor, wherein the memory stores instructions that, when executed by the processor, cause the processor to perform:
receiving a plurality of communications by one or more users, transmitted in a form of data streams, from one or more social media platforms in electronic communication with the contact center system;
determining valuation scores for the communications, the valuation scores comprising sentiment scores corresponding to the communications, the determining the valuation scores comprises:
determining a geolocation of a communication of the communications to inform meaning of words of the communication;
parsing a text of the communication; and
determining a sentiment score of the sentiment scores corresponding to the communication based on the parsed text and the geolocation of the communication;
filtering the communications based on a criteria;
reorganizing the filtered communications based on the valuation scores; and
routing the filtered communications to a plurality of agent devices of the contact center system,
wherein filtering the communications based on the criteria comprises:
determining whether to discard one or more of the communications based on the criteria; and
identifying only non-discarded communications as filtered communications for routing to the plurality of agent devices of the contact center system.

10. The system of claim 9, wherein the instructions further cause the processor to perform:
buffering the communications received from the one or more social media platforms in a first queue for a first period of time; and
analyzing the buffered communications for relevance to the organization based on existence of one or more keywords in corresponding texts of the communications.

11. The system of claim 9, wherein analyzing the communications for relevance is further based on one or more of geolocation of the communications, originations times of the communications, and identities of authors of the communications.

12. The system of claim 9, wherein determining valuation scores for the communications comprises:
determining one or more valuation scores associated with a communication of the plurality of communications based on one or more of a sentiment of the communication, a number of impressions of posts of an author of the communication over a period of time, attentiveness of the author of the communication, number followers of the author of the communication, number of users being followed by the author of the communication, biographical information of the author of the communication, geolocation of the communication, time of the communication, profile engagement of the of the author of the communication, a response distance of the communication.

13. The system of claim 9, wherein determining valuation scores for the communications comprises utilizing a machine learning system to determine one or more valuation scores for each communication of the plurality of communications based on one or more of a sentiment of the communication, a number of impressions of posts of an author of the communication over a period of time, attentiveness of the author of the communication, number followers of the author of the communication, number of users being followed by the author of the communication, biographical information of the author of the communication, geolocation of the communication, time of the communication, profile engagement of the of the author of the communication, a response distance of the communication.

14. The system of claim 9, wherein the criteria comprises one or more of geolocation of expression, time of origination, gender of expression author, one or more valuations scores.

15. The system of claim 9, wherein determining whether to discard comprises:
   comparing one or more valuation scores of each one of the communications with one or more associated threshold values; and
   discarding, by the processor, a communication of the plurality of communications for which the one or more associated valuation scores is below the one or more associated threshold values.

16. The system of claim 9, wherein reorganizing the filtered communications based on the valuation scores comprises:
   buffering, by the processor, the filtered communications in a second queue for a second period of time; and
   sorting, by the processor, the filtered communications in the second queue based on the valuation scores.

17. A system for routing social media communication in a contact center system supporting an organization, the system comprising:
   means for receiving a plurality of communications by one or more users, transmitted in a form of data streams, from one or more social media platforms in electronic communication with the contact center system;
   means for determining valuation scores for the communications, the valuation scores comprising sentiment scores corresponding to the communications, means for determining the valuation scores comprises:
      means for determining a geolocation of a communication of the communications to inform meaning of words of the communication;
      means for parsing a text of the communication; and
      means for determining a sentiment score of the sentiment scores corresponding to the communication based on the parsed text and the geolocation of the communication;
   means for filtering the communications based on a criteria;
   means for reorganizing the filtered communications based on the valuation scores; and
   means for routing the filtered communications to a plurality of agent devices of the contact center system,
   wherein the means for filtering the communication based on the criteria comprises:
      means for determining whether to discard one or more of the communications based on the criteria; and
      means for identifying only non-discarded communications as filtered communication for routing to the plurality of agent devices of the contact center system.

* * * * *

UNITED STATES PATENT AND TRADEMARK OFFICE
CERTIFICATE OF CORRECTION

PATENT NO. : 10,382,629 B2
APPLICATION NO. : 15/847724
DATED : August 13, 2019
INVENTOR(S) : Edward Dale Victor McCoy Page 1 of 1

It is certified that error appears in the above-identified patent and that said Letters Patent is hereby corrected as shown below:

In the Claims

| | |
|---|---|
| Column 24, Line 30 (approx.), Claim 1 | delete "'communications," and insert -- communications, -- |
| Column 25, Line 23, Claim 4 | delete "'of the of the" and insert -- of the -- |
| Column 25, Line 37, Claim 5 | delete "of the of the" and insert -- of the -- |
| Column 26, Line 54, Claim 12 | delete "of the" (first occurrence) |
| Column 27, Line 1, Claim 13 | delete "of the of the" and insert -- of the -- |

Signed and Sealed this
Seventh Day of July, 2020

Andrei Iancu
*Director of the United States Patent and Trademark Office*